United States Patent

[11] 3,566,002

[72] Inventor Kenard D. Brown
 1227 S. Willow St., Casper, Wyo. 82601
[21] Appl. No. 720,814
[22] Filed Apr. 12, 1968
[45] Patented Feb. 23, 1971
 Continuation-in-part of application Ser. No.
 444,563, Apr. 11, 1965, now abandoned

[54] FLEXIBLE TUBING STRUCTURE
 7 Claims, 6 Drawing Figs.
[52] U.S. Cl. .................................................. 174/47,
 138/109, 138/129, 138/138, 138/140, 174/76
[51] Int. Cl. ................................................... F16l 11/12
[50] Field of Search ............................................ 174/47, 68,
 68 (C), 105, 108, 110.43, 126.2, 74, 76, 77;
 138/118, 129—134, 137—141, 144, 153, 172,
 109; 340/320; 166/242 (Cursory); 156/54, 200,
 201

[56] References Cited
 UNITED STATES PATENTS
 194,363  8/1877  Merrens ..................... 138/133
 301,417  7/1884  Wilkinson ................... 174/47

Primary Examiner—Laramie E. Askin
Attorney—McGrew and Edwards

ABSTRACT: A flexible tubing for various industrial purposes including the transmission of fluids under pressure and the protection of the circular cross section from distortion due to external forces, both lateral and longitudinal, The tubing comprises a thin-walled central tube of smooth material, and a strip or ribbon of thin flexible material of high tensile strength wrapped longitudinally about the tube with its edges overlapping; the strip is held in tight face engagement with the tube and the overlapping edges with each other by a helical reinforcing wire having a plastic coating and wrapped securely about the tubing with adjacent turns in engagement with one another. The wrapping conforms closely to the tube does not tend to spring away therefrom and thus holds the strip securely in engagement with the tube during bending thereof. A second elongated strip with overlapping edges and a second helical wrapping may be provided for further reinforcement and by making the strips of electrical conducting material or providing conducting layers on the strips the wires and strips may be used as conductors in an electric signalling system to assure detection of damage to the tubing.

PATENTED FEB 23 1971

3,566,002

INVENTOR.
KENARD D. BROWN
BY
*McGrew & Edwards*
ATTORNEYS

FLEXIBLE TUBING STRUCTURE

This application is a continuation-in-part of my copending application Ser. No. 444,563 filed Apr. 1, 1965 now abandoned.

This invention relates to flexible tubing structures and particularly to an improved tubing assembly of light weight which is capable of holding fluids under pressure and of sustaining tension loads.

For many applications requiring the transmission of fluids over substantial distances it is desirable that the transmission tubing be readily installed and removed. The handling of tubing under these conditions requires that the tubing be capable of withstanding substantial loads in tension while maintaining the required pressures of the transmitted fluids. For example, flexible tubing may be employed to pump oil from a shore station to a ship anchored a substantial distance from the shore. For this purpose the tubing may be unreeled from a boat proceeding to the ship and then connected to supply the ship, the tubing being allowed to float during the transfer of the oil. The pumping operation requires that the tubing be able to withstand substantial pressures and that it maintain its pressure-resisting characteristics during reeling and unreeling in the course of installation and removal. Various tubing structures have been proposed for this type of installation; however, these structures have not proved entirely satisfactory for all applications. Accordingly, it is an object of the present invention to provide an improved tubing structure capable of withstanding substantial internal pressure and of sustaining tension loads.

It is another object of this invention to provide a tubing structure for the transmission of fluids which is of light weight, flexible, and capable of withstanding substantial pressures and tension loads.

Briefly, in carrying out the objects of this invention in one embodiment thereof, a tubing liner of moldable synthetic plastic material and having a smooth outer surface has arranged about it a thin flat strip of oriented plastic material capable of withstanding substantial loads under tension. The strip is folded closely about the liner with its longitudinal edges overlapping and extends longitudinally the length of the liner. In order to hold the strip securely in position and to maintain it in conforming engagement with the liner, a tight helical reinforcing wire having a coating of plastic material is wrapped about the strip. This wire is secured about the strip in gripping relationship so that it does not unwind if the tubing is cut or broken. Under tension loads the strip of oriented material is effective to resist deformation of the tubing while affording relative movement of the tubing strip and helical winding to equalize loads and prevent distortion or injury during flexing.

In another embodiment of the invention a second strip and a second helical wire are provided to afford increased reinforcement. The strips may be provided with an electrically conducting layer or coating and with the helical wires may be employed in electrical signal circuits to detect damage to the tubing assembly.

The features of novelty which characterize this invention are pointed out with particularity in the claims annexed to and forming a part of this specification. The invention itself, however, both as to its organization and its method of use, together with further objects and advantages thereof, will be best understood on reference to the following description taken in connection with the accompanying drawings in which:

Figure 1:
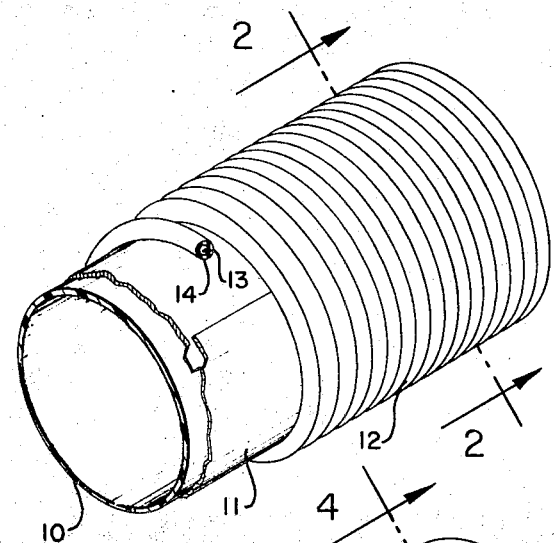
FIG. 1 is a perspective view of a tubing structure embodying the invention.
Figure 2:
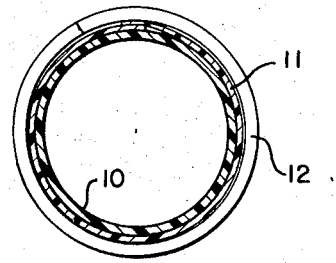
FIG. 2 is a sectional elevation view taken along the line 2—2 of FIG. 1.

Referring now to the drawings, the tubing structure illustrated in FIGS. 1 and 2 comprises a plastic liner 10 which has been illustrated as a smooth relatively thin-walled tube of molded plastic material about which is wrapped a ribbonlike strip of oriented synthetic plastic material indicated at 11. By way of example, the material of the strip 11 may comprise longitudinally arranged glass filaments embedded in the plastic or it may be an oriented long chain synthetic polymer such as one of the polyamides known generally as "nylon" and which have the characteristic of high tensile strength along one axis. Such materials are available on the market in strip or ribbon form. The strip is arranged so that it is oriented to provide high tensile strength in the direction of its longitudinal axis. The edges of the strip 11 are overlapped and the structure is securely held together by a helical wrapping of reinforcing wire indicated at 12, this wire being wrapped securely about the ribbon 11 and thereby holding the ribbon securely in conforming relationship to the outer surface of the liner 10, and the edges of the strip are held together in tight face engagement to provide, in effect, a tubular enclosure of the liner 10. While the liner 10 has been illustrated as having a smooth outer surface in the preferred embodiments, other configurations of the surface may be desirable for some applications of the invention. This construction provides a tension member uniformly effective about the entire circumference of the liner 10, and the overlapping arrangement allows expansion and contraction of the tubing assembly while maintaining the tension member in full circumferential engagement with the liner at all times, the overlapping edges sliding with respect to one another during its expansion and contraction.

The helical wrapping 12 as illustrated comprises a steel wire 13 having a coating of plastic indicated at 14, the external surface of the plastic coating being smooth and the turns or coils of the wrapping being in abutting relationship to one another. The helical wrapping preferably is made so that it has no tendency to unwind in the event the tubing is cut or broken. This method of wrapping makes it possible to use a very thin walled tube at the liner 10, and affords greater flexibility of the completed assembly. For some applications the plastic coating may be omitted form from the wrapping wire and a bare wire used instead. A method for wrapping a helical spring winding in this manner is disclosed in my copending application Ser. No. 499,374, filed Oct. 21, 1965, now U.S. Pat. No. 3,478,408 issued Nov. 11, 1969.

The tubular structure as illustrated in FIGS. 1 and 2 is highly flexible and may be reeled and unreeled so that it may be placed in position from a moving vehicle, suitable couplings being provided for connecting successive lengths and the ends of the tubing. The structure of the tubing is such that it may be made continuously in great lengths and carried on reels of substantial capacity. The helical wrapping holding the tension member 11 securely about the tubing provides resistance to internal pressure, to crushing by external force, and to strain along the length of the tubing which is resisted by the tension member 11.

Figure 3:
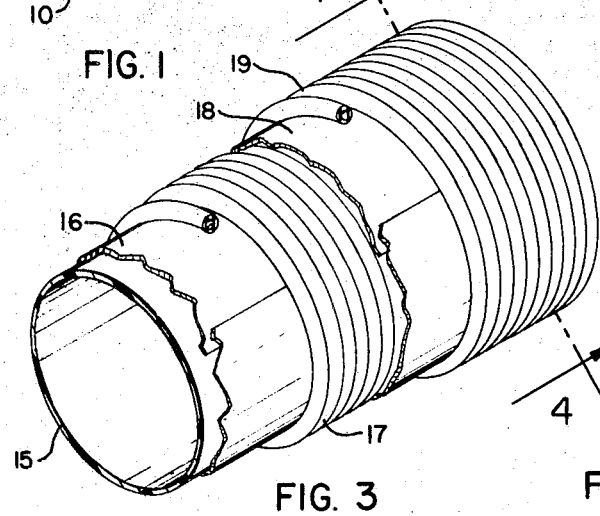
FIG. 3 is a perspective view of a tubular structure illustrating a modified form of the invention.
Figure 4:
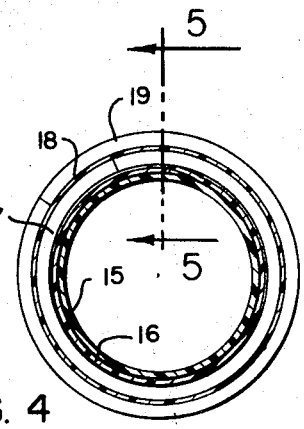
FIG. 4 is a sectional elevation view taken along the line 4—4 of FIG. 3.

In the embodiment illustrated in FIGS. 3 and 4, a flexible tubing of essentially the same construction as that of FIG. 1 is provided with additional reinforcement by the wrapping of a second ribbonlike tension strip and a second helical wire about the first helical wrapper. In this construction, a thin-walled tubing or liner 15 of plastic material is enclosed in a tension strip 16 held in face engagement with the liner by a helical wire wrapping 17. The longitudinal edges of the strip 16 are held in overlapping engagement. A second tension strip 18 is held about the wire wrapping 17 by a second helical wire wrapping 19 each turn of which bends the strip 18 slightly between adjacent turns of the wrapping 17. The strips 16 and 18 are constructed of the same material and in the same manner as the strip 11 of FIG. 1. This reinforced construction of the tubing assembly has substantial flexibility because the plastic surfaces of the components have relatively low coefficients of friction and allow some relative movement during bending of the assembly.

Figure 5:
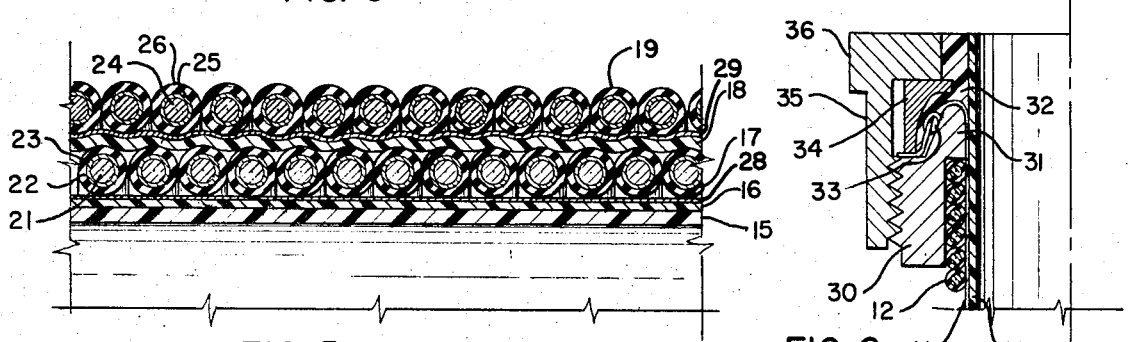
FIG. 5 is an enlarged sectional view taken along the line 5—5 of FIG. 4.

In addition to the reinforcement provided by the tubing structure of FIGS. 3 and 4, the construction is such that by providing components having electrical conductivity the assembly may be utilized with an electric signal system to provide an indication of damage to the structure. As shown in FIG. 5, the wire of the helical wrapping 17 comprises a spring steel core 21 having a coating 22 of copper or other good electrical conductor and an insulating plastic coating 23. The wrapping 19 comprises similar wire having a steel core 24, a conducting coating 25 and a plastic coating 26. The tension strips 16 and 18 are made electrically conducting by providing layers or coatings 28 and 29, respectively, of metallic conducting material. It will now be observed that if a drill or other metal instrument is passed through the wrappings it will contact the wires of the wrapping and also the conductors of both strips. The turns of the wrappings are wound tightly and cannot easily be pried apart they being locked against relative lateral movement by the partial meshing of the turns of the winding 19 in the spaces between the turns of the winding 17; it is thus extremely difficult to form an opening for access to the interior of the tubing assembly without contacting at least two of the electrically conducting components at the same time. Suitable electrical signal circuits may be provided to detect such contact; such circuits have not been illustrated as they are not necessary to an understanding of the present invention.

Figure 6:
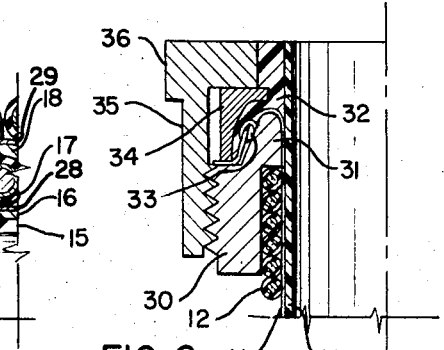
FIG. 6 is a partial sectional view of a fitting for the end of the tubing.

The tension strips 11, 16 and 18 of the two embodiments may be connected to suitable fittings so that substantially the entire tension load on the tubing is carried by the tension strip. By way of example, one type of fitting suitable for this purpose is shown in FIG. 6. The fitting comprises a main body member 30 formed with an inwardly extending collar or shoulder 31 the internal diameter of which is sufficient to accommodate the liner or tubing 10 of the assembly of FIG. 1 with an annular space through which the strip 11 is passed. The strip is cut to provide a plurality of longitudinal ribbons each of which is knotted and then bent over the shoulder 31 and extends radially outwardly—one such ribbon is indicated at 32 in FIG. 6 and the knot therein at 33. The outer end of the ribbon is held under a pressure ring 34 which is clamped securely in position by a threaded ring 35. When the ring 35 has been securely clamped, the spaces between the tubing 10 and the components of the fitting are filled with a suitable potting compound such as an epoxy resin which, when set, holds the ribbon ends of the tension strip rigidly and securely in position so that the tension load is transmitted between the tension strip and the fitting. The fitting is provided with an external clamping shoulder or ring 36 which may be employed to clamp the fitting to another fitting or to an anchor block.

The even distribution of the tension load about the circumference of the tubing liners facilitates the connection of long lengths of the tubing assembly and assures effective transmission of the tension load during flexing or bending of the tubing without kinking, distortion or breakage of the liner. Furthermore, by maintaining the longitudinal strips in overlapping relationship the strip is always present about the entire circumference of the tube between the helical coil and the tube and internal pressure is prevented from blowing the tube wall outwardly which would be possible for a thin-walled tube if there were a gap between the edges of the strip. Thus the combination of the helical wrapping and the longitudinal strip provides effective lateral reinforcement and makes possible the use of the thin-walled liner.

While the invention has been described in connection with specific embodiments, various modifications and other applications will occur to those skilled in the art. Therefore it is not desired that the invention be limited to the specific constructions illustrated and described and it is intended by the appended claims to cover all modifications which fall within the spirit and scope of the invention.

I claim:

1. A tubing structure of the type affording at least limited relative movement of the components thereof comprising components including a tubular member having an exterior surface portion of synthetic plastic material, a longitudinal member comprising a single ribbonlike strip extending the length of said tubular member and wrapped laterally about said tubular member with its edge portions in continuous longitudinal overlapping engagement, the material of said ribbonlike member having a high tension load-carrying capacity in the direction of its longitudinal axis, and helical reinforcing wire comprising a multiplicity of coils disposed in firm self retaining engagement with said longitudinal member and with adjacent coils in engagement for holding said strip securely about said tubular member in close surrounding engagement with said exterior surface portion thereof, said tubular member and said strip and said overlapping edges and the coils of said helical wire being relatively movable with respect to one another and said structure being held in assembled arrangement by said helical wire, whereby the coils of said wire and said strip and said tubular member may move with respect to one another during flexing to equalize loads and prevent injury of said structure.

2. A tubing structure as set forth in claim 1 wherein said ribbonlike strip comprises an oriented synthetic plastic.

3. A tubing structure as set forth in claim 1 wherein said ribbonlike strip comprises a multiplicity of longitudinally arranged glass fiber filaments embedded in a synthetic plastic.

4. A tubing structure as set forth in claim 1 including a smooth synthetic plastic coating on said helical wire.

5. A tubing structure as set forth in claim 4 including a second longitudinal member of the same construction as said first-mentioned longitudinal member enclosing said helical wire and having its longitudinal edges overlapping, and a second helical reinforcing wire of the same construction as said first helical wire and wrapped firmly about said second strip in self-retaining engagement.

6. A tubing structure comprising a tubular member having an exterior surface portion of plastic material, a longitudinal member comprising a single ribbonlike strip extending the length of said tubular member and wrapped laterally about said tubular member with its edge portions in continuous longitudinal overlapping engagement, the material of said ribbonlike member having high tension load carrying capacity in the direction of its longitudinal axis, a helical reinforcing wire comprising a multiplicity of coils disposed in firm self-retaining engagement with said longitudinal member and with adjacent coils in engagement for holding said strip securely about said tubular member in close surrounding engagement with said exterior surface portion thereof, a second longitudinal member of the same construction as said first-mentioned longitudinal member enclosing said helical wire and having its longitudinal edges overlapping, and a second helical reinforcing wire of the same construction as said first helical wire and wrapped firmly about said second strip in self-retaining engagement, each of said wires having a good electrical conducting coating and each of said strips having thereon a layer of electrical conducting material.

7. A tubing structure of the type affording at least limited relative movement of the components thereof comprising components including a tubular member having an exterior surface portion of synthetic plastic material, a longitudinal member comprising a single ribbonlike strip extending the length of said tubular member and wrapped laterally about said tubular member with its edge portions in continuous longitudinal overlapping engagement, the material of said ribbonlike member having a smooth surface and a high tension load-carrying capacity in the direction of its longitudinal axis, and a helical reinforcing wire comprising a multiplicity of coils disposed in firm self retaining engagement with said longitudinal member and with adjacent coils in engagement for holding said strip securely about said tubular member in close surrounding engagement with said exterior surface portion thereof, said tubular member and said strip extending beyond said helical reinforcing wire at one end of said structure and having a fitting mounted on said end of said structure, said fitting including an inner collar fitting closely about said strip and clamping means including an outer collar threaded on said inner collar and providing an annular space about the end of said tubular member, the end of said strip beyond said fitting being divided to provide a multiplicity of small strips, each of said small strips being drawn tightly through said space and being clamped in said clamping means with a knot in each strip lying within said space and held tight by said clamping means, and a body of synthetic plastic potting material filling said space and locking said knots securely therein.